(12) United States Patent
Alford

(10) Patent No.: US 9,078,422 B1
(45) Date of Patent: Jul. 14, 2015

(54) ANIMAL DETERRENT APPARATUSES

(71) Applicant: Dempsey D. Alford, Benton, LA (US)

(72) Inventor: Dempsey D. Alford, Benton, LA (US)

(*) Notice: Subject to any disclaimer, the term of this patent is extended or adjusted under 35 U.S.C. 154(b) by 0 days.

(21) Appl. No.: 14/492,596

(22) Filed: Sep. 22, 2014

(51) Int. Cl.
| | |
|---|---|
| A01M 29/24 | (2011.01) |
| A01K 3/00 | (2006.01) |
| A01K 15/04 | (2006.01) |
| A01K 39/01 | (2006.01) |
| A01G 13/10 | (2006.01) |
| A01K 15/02 | (2006.01) |

(52) U.S. Cl.
CPC ............... *A01M 29/24* (2013.01); *A01G 13/10* (2013.01); *A01K 3/005* (2013.01); *A01K 15/029* (2013.01); *A01K 15/04* (2013.01); *A01K 39/0113* (2013.01)

(58) Field of Classification Search
CPC ....... A01M 29/24; A01K 3/005; A01K 15/04; A01K 39/0113; A01G 13/10; E04H 17/003
USPC ........... 52/101; 47/32.4, 32.5; 119/52.3, 57.9; 256/10; 43/98; 361/232
See application file for complete search history.

(56) References Cited

U.S. PATENT DOCUMENTS

| | | | | |
|---|---|---|---|---|
| 1,915,752 | A | | 6/1933 | Obbard |
| 2,315,757 | A | * | 4/1943 | Wenger ........................ 361/232 |
| 3,001,765 | A | * | 9/1961 | Shobert ........................... 256/10 |
| 3,491,480 | A | * | 1/1970 | Nickel et al. ...................... 49/59 |
| 4,637,164 | A | * | 1/1987 | Brown .......................... 47/32.5 |
| 5,392,732 | A | | 2/1995 | Fry |
| 5,648,641 | A | * | 7/1997 | Guthrie ......................... 174/139 |
| 5,877,949 | A | * | 3/1999 | Wolfgram et al. .............. 363/61 |
| 6,065,427 | A | | 5/2000 | Peinetti |
| 6,125,595 | A | | 10/2000 | Showalter |
| 6,827,042 | B1 | * | 12/2004 | Riddle et al. .................. 119/712 |
| 7,191,735 | B2 | * | 3/2007 | Wolfgram ...................... 119/712 |
| 8,115,102 | B2 | | 2/2012 | Frye |
| 8,230,812 | B2 | | 7/2012 | Ross |
| 2002/0139061 | A1 | | 10/2002 | Roberts |
| 2003/0192265 | A1 | | 10/2003 | Wulff et al. |
| 2009/0032790 | A1 | * | 2/2009 | Timms ............................ 256/25 |
| 2010/0263303 | A1 | * | 10/2010 | Kiserman ....................... 52/101 |

* cited by examiner

*Primary Examiner* — Robert Canfield
(74) *Attorney, Agent, or Firm* — R. Keith Harrison

(57) ABSTRACT

Animal deterrent apparatuses have an apparatus frame including an at least partially electrically-conductive main frame portion, an at least partially electrically-conductive electrified frame portion generally exterior to the main frame portion and at least one electrically-insulating element between the electrified frame portion and the main frame portion; a ground electrically connected to the main frame portion of the apparatus frame; and an electrifying source electrically connected to the electrified frame portion of the apparatus frame.

18 Claims, 4 Drawing Sheets

ANIMAL DETERRENT APPARATUSES

FIELD

Illustrative embodiments of the disclosure generally relate to apparatuses for preventing animals from ascending a tree or other structure. More particularly, illustrative embodiments of the disclosure relate to animal deterrent apparatuses which can be deployed around a tree or other protected structure and utilize an electric charge to prevent animals from accessing and ascending the structure.

BACKGROUND

The background description provided herein is solely for the purpose of generally presenting the context of the illustrative embodiments of the disclosure. Aspects of the background description are neither expressly nor impliedly admitted as prior art against the claimed subject matter.

Scavenging animals such as squirrels, rodents or other wildlife frequently climb vertical structures such as fruit trees and the like to scavenge fruit from the trees or otherwise cause damage to the structures. In many areas, it is practically impossible to grow fruits or nuts on a small backyard tree because of scavenging animals such as squirrels, rodents or other wildlife which climb into the tree to eat or otherwise destroy the fruits or nuts. Although bird feeders and other wildlife feeders are popular, squirrels and other unintended wildlife often eat the feed and/or damage the feeders which contain the feed. Various other vertical structures may also be damaged by climbing animals.

Various animal deterring devices have been developed for the purpose of blocking or deterring scavenging animals from access to vertical structures. However, conventional animal deterring devices may have drawbacks. For example, scavenging animals may be capable of evading or circumventing these devices. Falling fruit, nuts, leaves, twigs or other debris may compromise their effectiveness. Moreover, conventional devices may not be easily adapted to different-sized or shaped vertical structures.

Accordingly, animal deterrent apparatuses which can be deployed around a tree or other protected structure, which cannot be circumvented, the effectiveness of which are not compromised by falling debris and which can be easily adapted to fit any size or shape of vertical structure may be desirable for some applications to prevent animals from accessing and ascending such structures.

SUMMARY

Illustrative embodiments of the disclosure are generally directed to animal deterrent apparatuses which can be deployed around a tree or other structure to prevent animals from ascending the structure. An illustrative embodiment of the animal deterrent apparatuses has an apparatus frame including an at least partially electrically-conductive main frame portion, an at least partially electrically-conductive electrified frame portion generally exterior to the main frame portion and at least one electrically-insulating element between the electrified frame portion and the main frame portion; a ground electrically connected to the main frame portion of the apparatus frame; and an electrifying source electrically connected to the electrified frame portion of the apparatus frame.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 4:
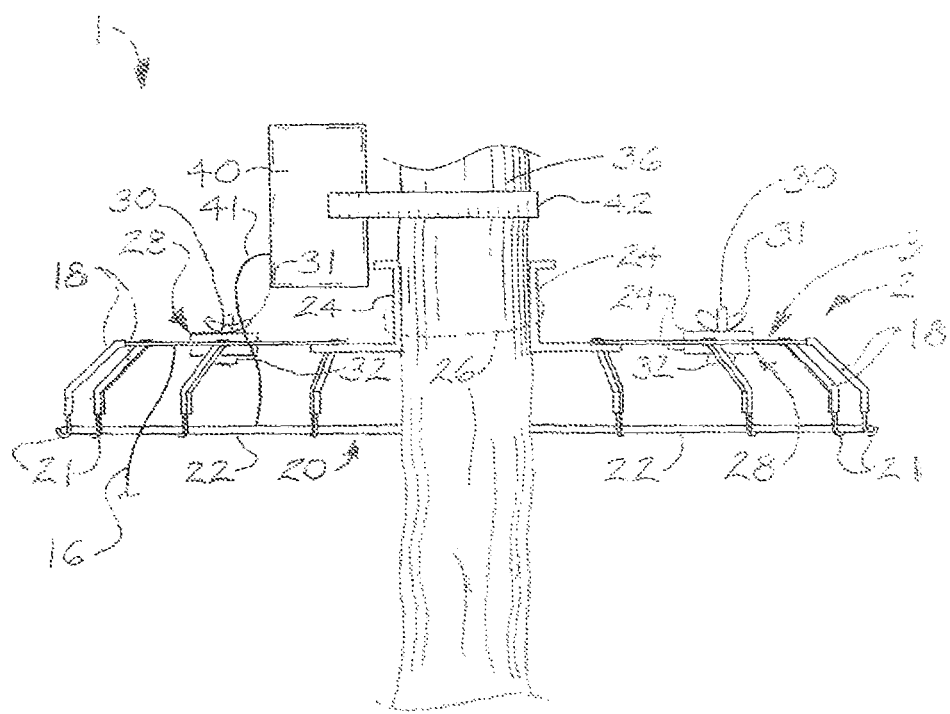
FIG. 4 is a cross-sectional view, taken along section lines 2-2 in FIG. 1, of a typical apparatus frame according to an illustrative embodiment of the animal deterrent apparatuses, with the electrified element seated in the frame hooks on the electrified frame portion of the apparatus frame, an electrifying source connected to the electrified element and the main frame portion of the apparatus frame grounded.

Referring to the drawings, an illustrative embodiment of the animal deterrent apparatus is generally indicated by reference numeral 1. As illustrated in FIG. 4 and will be hereinafter described, the apparatus 1 is adapted for placement around a protected structure 36 such as a tree, for example and without limitation, to prevent squirrels and other scavenging animals or wildlife (not illustrated) from accessing and climbing the protected structure 36. The apparatus 1 has an interior width/diameter 12 (FIG. 1) which may be selectively configurable to accommodate a protected structure 36 having a particular width, girth or diameter, as will be hereinafter described. As used herein, "protected structure" includes but is not limited to a tree, bush, shrub or other plant, telephone pole, light pole, utility pole, wildlife feeder or any other natural or manmade vertical structure which it may be deemed necessary to prevent scavenging animals such as squirrels, rodents or other wildlife from accessing and ascending the structure.

Figure 1:
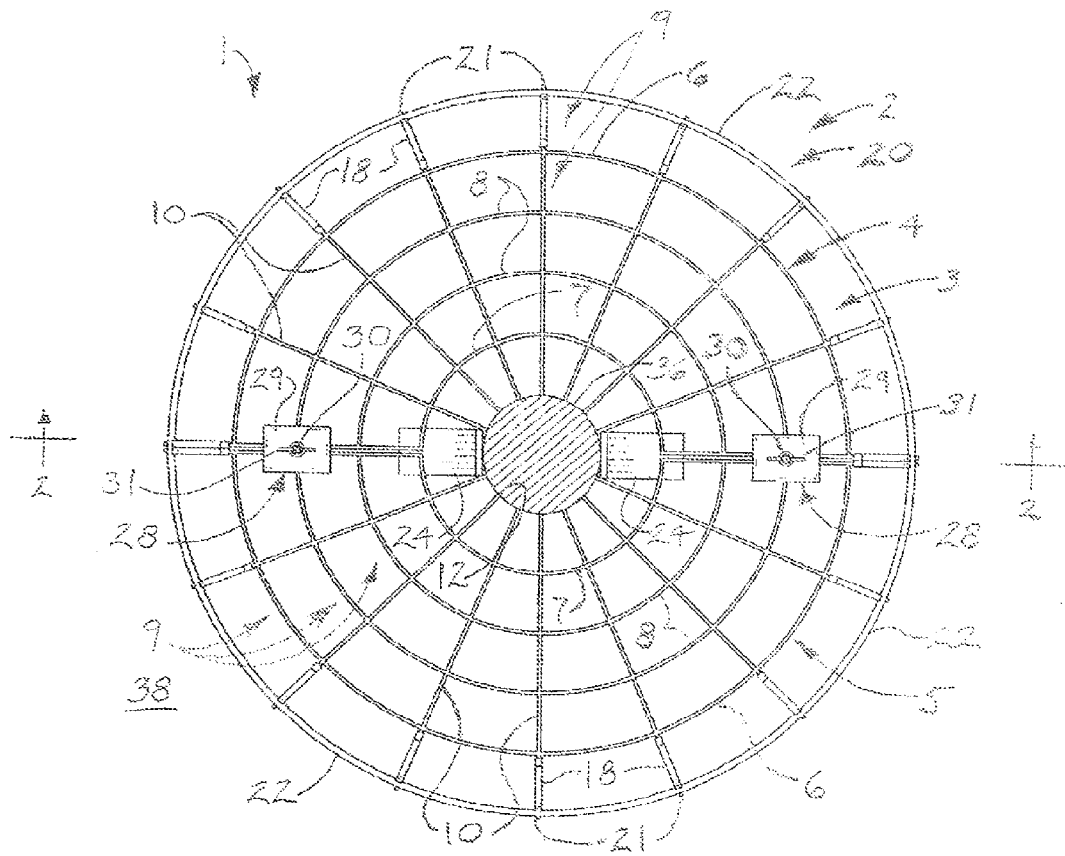
FIG. 1 is a top view of a typical apparatus frame of an illustrative embodiment of the animal deterrent apparatuses, deployed around a protected structure (illustrated in cross-section) in typical application of the apparatus.
Figure 5:
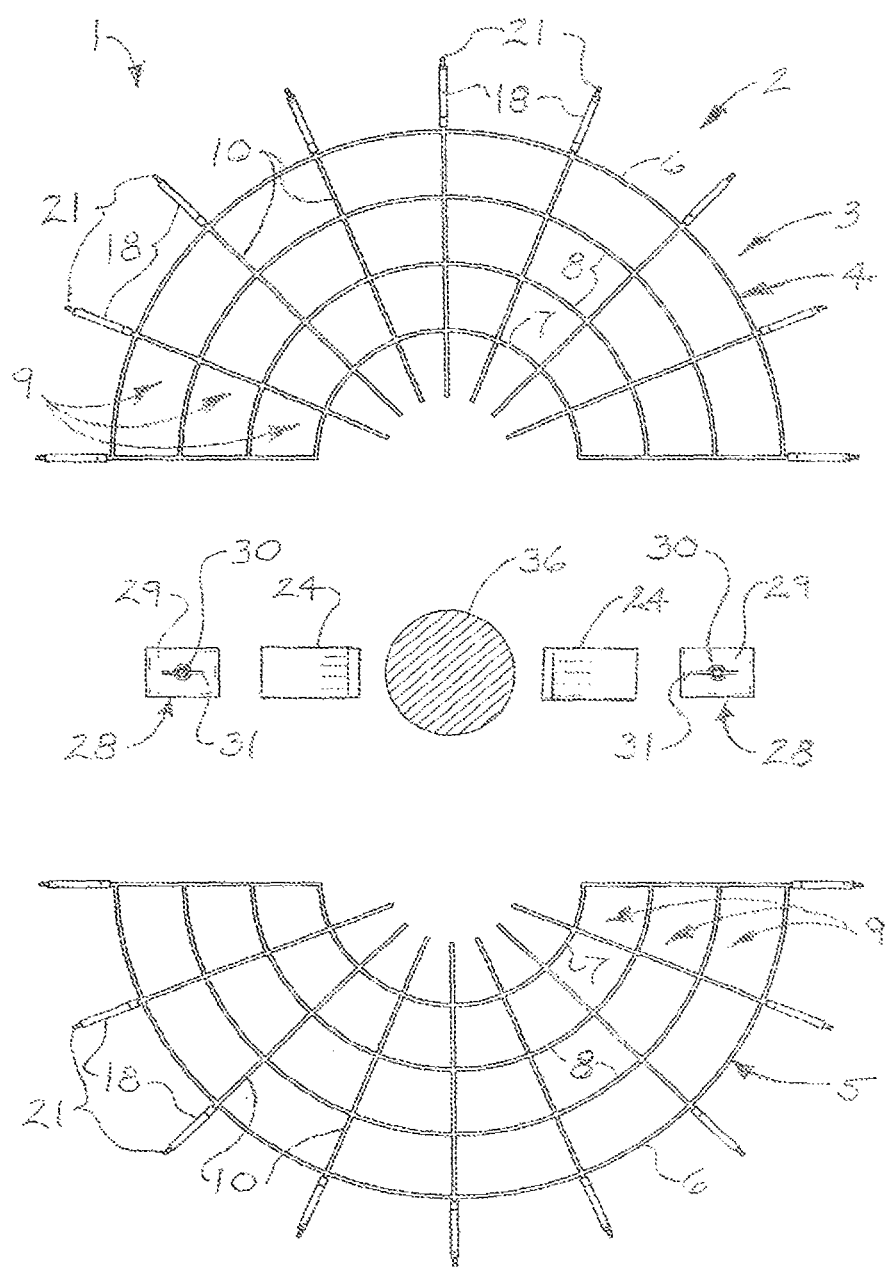
FIG. 5 is an exploded top view of an illustrative embodiment of the animal deterrent apparatuses, detached from the protected structure (illustrated in phantom)

As particularly illustrated in FIGS. 1 and 5, the apparatus 1 includes an apparatus frame 2 having an at least partially electrically-conductive main frame portion 3 and an at least partially electrically-conductive electrified frame portion 20 which is generally exterior to and electrically insulated from the main frame portion 3. At least one electrically-insulating element 18 may be provided between the electrified frame portion 20 and the main frame portion 3 to electrically insulate the electrified frame portion 20 from the main frame portion 3. As illustrated in FIG. 4, a ground 16 may be electrically connected to the main frame portion 3 of the apparatus frame 2 and extend to the ground (not illustrated) adjacent to the protected structure 36 for purposes of grounding the main frame portion 3. An electrifying source 40 may be electrically connected to the electrified frame portion 20 of the apparatus frame 2, such as through electrifying source wiring 41, for example and without limitation, for the purpose of electrifying the electrified frame portion 20. The electrifying source 40 may include any type of device or apparatus which is capable of supplying electrical current to the electrified frame portion 20 in sufficient voltage and amperage to impart an electric shock which is repellent to a scavenging animal as the animal contacts the electrified frame portion 20. A non-limiting example of an electrifying source 40 which is suitable for the purpose includes a HAVAHART® electric fence energizer (www.havahart.com).

Figure 2:
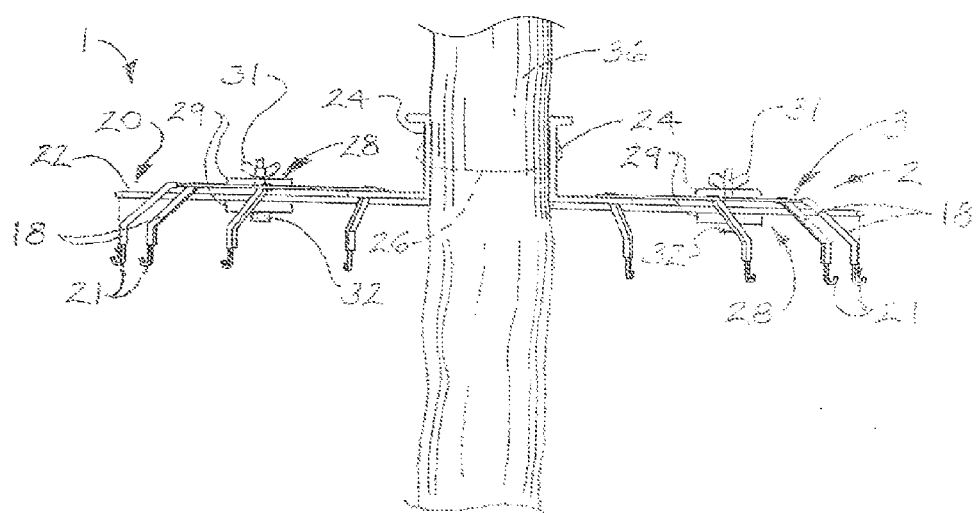
FIG. 2 is a partially exploded cross-sectional view, taken along section lines 2-2 in FIG. 1, of a typical apparatus frame according to an illustrative embodiment of the animal deterrent apparatuses, with an electrified element detached from frame hooks on an electrified frame portion of the apparatus frame.

As illustrated in FIG. 5, in some embodiments, the main frame portion 3 of the apparatus frame 2 may include a first apparatus frame section 4 and a second apparatus frame section 5 which is detachably or pivotally attached to the first apparatus frame section 4 according to any suitable technique known by those skilled in the art to facilitate placement of the apparatus frame 2 around the protected structure 36. For example and without limitation, in some embodiments, at least one frame section bracket 28 may detachably attach the second apparatus frame section 5 to the first apparatus frame section 4. As illustrated in FIGS. 2 and 4, in some embodiments, each frame section bracket 28 may include a pair of bracket plates 29 which engage opposite surfaces, respectively, of the main frame portion 3 at the junction between the first apparatus frame section 4 and the second apparatus frame section 5; a bracket plate fastener 30 which extends through registering fastener openings (not illustrated) in the respective bracket plates 29; and a wing nut 31 which threadably engages the bracket fastener 30 and secures the bracket plates 29 in place. In other embodiments, fasteners or brackets of alternative design known by those skilled in the art may detachably attach the second apparatus frame section 5 to the first apparatus frame section 4. In some embodiments, the second apparatus frame section 5 may be pivotally attached to the first apparatus frame section 4 at a frame hinge (not illustrated) according to the knowledge of those skilled in the art, such as in a clamshell configuration, for example and without limitation, to facilitate placement of the apparatus frame 2 around the protected structure 36. A bracket, latch or other frame locking mechanism (not illustrated) may be provided on the side of the apparatus frame 2 which is opposite the frame hinge to facilitate locking the apparatus frame 2 in place around the protected structure 36.

At least one frame mount bracket 24 may facilitate attachment of the main frame portion 3 of the apparatus frame 2 to the protected structure 36. In some embodiments, each frame mount bracket 24 may have an angled or beveled shape to facilitate deployment of the first apparatus frame section 4 and the second apparatus frame section 5 of the main frame portion 3 in a downwardly-sloped position from the protected structure 36. The frame mount bracket or brackets 24 may be attached to the apparatus frame 2 using a suitable bracket attachment mechanism 26 (illustrated in phantom in FIGS. 2 and 4) which may include brackets, clamps, mechanical fasteners, welding, straps or cords (not illustrated), for example and without limitation.

As illustrated in FIGS. 1 and 5, in some embodiments, the apparatus frame 2 may be generally circular. In other embodiments, the apparatus frame 2 may be generally rectangular or may have any other alternative polygonal or non-polygonal shape. The main frame portion 3 of the apparatus frame 2 may include multiple concentric frame members 6, 7, 8 of various diameters or widths and multiple connecting frame members 10 which connect the concentric frame members 6, 7, 8. In some embodiments, the concentric frame members may include an outer concentric frame member 6, an inner concentric frame member 7 and at least one middle concentric frame member 8 between the outer concentric frame member 6 and the inner concentric frame member 7. The interior width/diameter 12 (FIG. 1) of the apparatus frame 2 may be defined by the inner concentric frame member 7, one of the middle concentric frame members 8 outer concentric frame member 6 or alternatively, the innermost ends of the connecting frame members 10 in the main frame portion 3, as illustrated. Frame openings 9 may be formed by and between the concentric frame members 6, 7, 8 and the connecting frame members 10. The frame openings 9 may be sufficiently small to prevent a scavenging animal from circumventing the apparatus frame 2 by climbing through the frame openings 9. In other embodiments, the main frame portion 3 of the apparatus frame 2 may have any alternative design which is consistent with the functional requirements of main frame portion in the animal deterrent apparatus 1.

Figure 3:
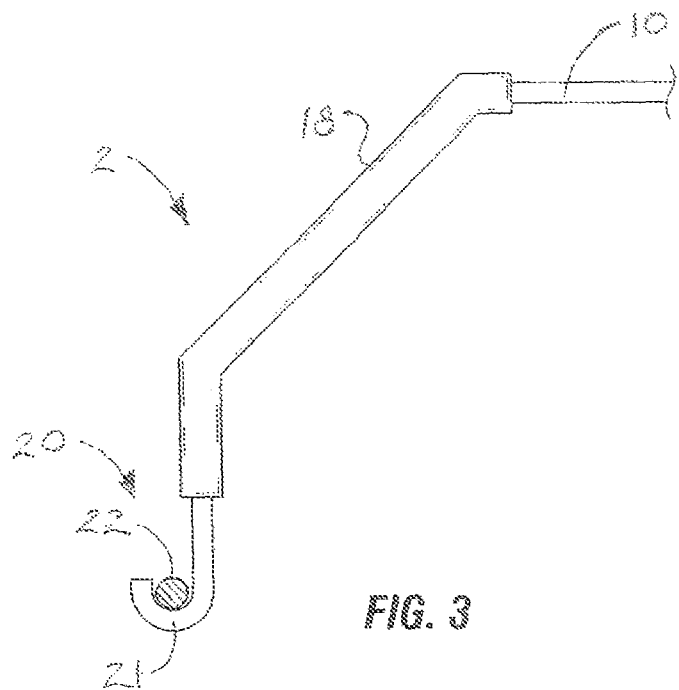
FIG. 3 is a side view of an electrified frame portion, partially in section, on a typical apparatus frame according to an illustrative embodiment of the animal deterrent apparatuses.

The electrically-insulating element or elements 18 may be provided between the connecting frame members 10 of the main frame portion 3 and the electrified frame portion 20. In some embodiments, multiple electrically-insulating elements 18 may extend from the connecting frame members 10, respectively, of the main frame portion 3, as illustrated. As illustrated in FIG. 3, each electrically-insulating element 18 may be beveled or disposed at an obtuse angle to the corresponding connecting frame member 10 from which it extends for purposes of which will be hereinafter described. Each electrically-insulating element 18 may include any type electrically-insulating material including but not limited to rubber, plastic, wood or composite materials.

As illustrated in FIGS. 1-4, the electrified frame portion 20 of the apparatus frame 2 may include an electrically-conductive element 22 which may be supported by or attached to the electrically-insulting element or elements 18 according to the knowledge of those skilled in the art. For example and without limitation, in some embodiments multiple frame hooks 21 may extend from the electrically-insulating element 18 or the respective electrically-insulating elements 18. The electrified element 22 of the electrified frame portion 20 may be detachably or removably seated in the frame hooks 21. In some embodiments, the electrified element 22 may include two or more electrified element sections (not illustrated) which detachably or pivotally interface with each other in a clamshell configuration, for example without limitation, to facilitate placement of the electrified element 22 in the frame hooks 21 in surrounding relationship to the protected support 36.

In typical application, the animal deterrent apparatus 1 is deployed around the protected structure 36 to prevent squirrels and other scavenging animals or wildlife (not illustrated)

from accessing and climbing the protected structure 36 typically from the ground (not illustrated) beneath or adjacent to the protected structure 36. Accordingly, the first apparatus frame section 4 and the second apparatus frame section 5 are initially placed around opposite sides of the protected structure 36 with the protected structure 36 extending through the interior width/diameter 12 (FIG. 1) of the main frame portion 3. The first apparatus frame section 4 and the second apparatus frame section 5 may be secured to each other via the frame section bracket or brackets 28. The electrified element 22 may be seated in the frame hooks 21 of the electrified frame portion 20. In some embodiments, each frame mount bracket 24 may be angled or beveled such that the first apparatus frame section 4 and the second apparatus frame section 5 slope downwardly from the protected structure 36, as noted above.

As illustrated in FIGS. 1 and 2, the assembled apparatus frame 2 may be secured to the protected structure 36 above the ground such as by using the frame mount bracket or brackets 24. The apparatus frame 2 may be placed at a height on the protected structure 36 which is sufficient to prevent scavenging animals from jumping from the ground onto the portion of the protected structure 36 which extends above the apparatus frame 2. The electrifying source 40 may be fastened to the protected structure 36 typically above the apparatus frame 2 such as by using an electrifying source mount bracket 42 (FIG. 4), for example and without limitation. The electrifying source 40 may be electrically connected to the electrified element 22 of the electrified frame portion 20 through the electrifying source wiring 41. The main frame portion 3 of the assembly frame 2 may be grounded through the ground 16. The electrifying source 40 is energized to supply electrical current to the electrified element 22 of the electrified frame portion 20 through the electrifying source wiring 41.

In the event that a squirrel or other scavenging animal or wildlife (not illustrated) attempts to access the portion of the protected structure 36 which is above the apparatus 1 from beneath the apparatus 1, the animal may attempt to circumvent the apparatus 1 by climbing on the underside of the main frame portion 3 onto the upper side of the main frame portion 3. Accordingly, the animal simultaneously contacts both the electrically-grounded main frame portion 3 and the electrified element 22 such that electrical current flows from the electrified element 22 through the animal and the main frame portion 3, respectively, to the ground, shocking and repelling the animal from further attempts to access the portion of the protected structure 36 which extends above the apparatus frame 2. The small size of the frame openings 9 in the apparatus frame 2 prevents the animal from climbing through the apparatus frame 2 to the portion of the structure 36 which extends above the apparatus frame 2. Therefore, animals are incapable of accessing and climbing the protected structure 36, preventing scavenging of fruit in applications in which the protected structure 36 is a fruit tree or otherwise damaging the protected structure 36.

As illustrated in FIGS. 3 and 4, in some embodiments, the electrically-insulating elements 18 may be beveled and disposed at an obtuse angle to the respective connecting frame members 10, respectively, of the main frame portion 3. The frame mount brackets 24 which secure the apparatus frame 2 to the protected structure 36 may also be beveled or angled, as noted above. Accordingly, when the apparatus frame 2 is mounted on the protected structure 36, as illustrated in FIG. 4, the beveled electrically-insulating elements 18 angle outwardly and downwardly from the respective connecting frame members 10 of the main frame portion 3 to the respective frame hooks 21 of the electrified frame portion 20 and the frame mount brackets 24 angle outwardly and downwardly from the protected structure 36 to the main frame portion 3. In some embodiments, the first apparatus frame section 4 and the second apparatus frame section 5 of the main frame portion 3 may slope downwardly from the protected structure 36. Thus, in the event that leaves, twigs or other objects inadvertently fall from the protected structure 36, the falling objects have a tendency to fall on and slide or roll down the first apparatus frame section 4 and the second apparatus frame section 5 of the main frame portion 3 and the electrically-insulating elements 18 to the ground without accumulating on the electrified frame portion 20 and hindering the animal-repelling effects of the animal deterrent apparatus 1.

Figure 6:
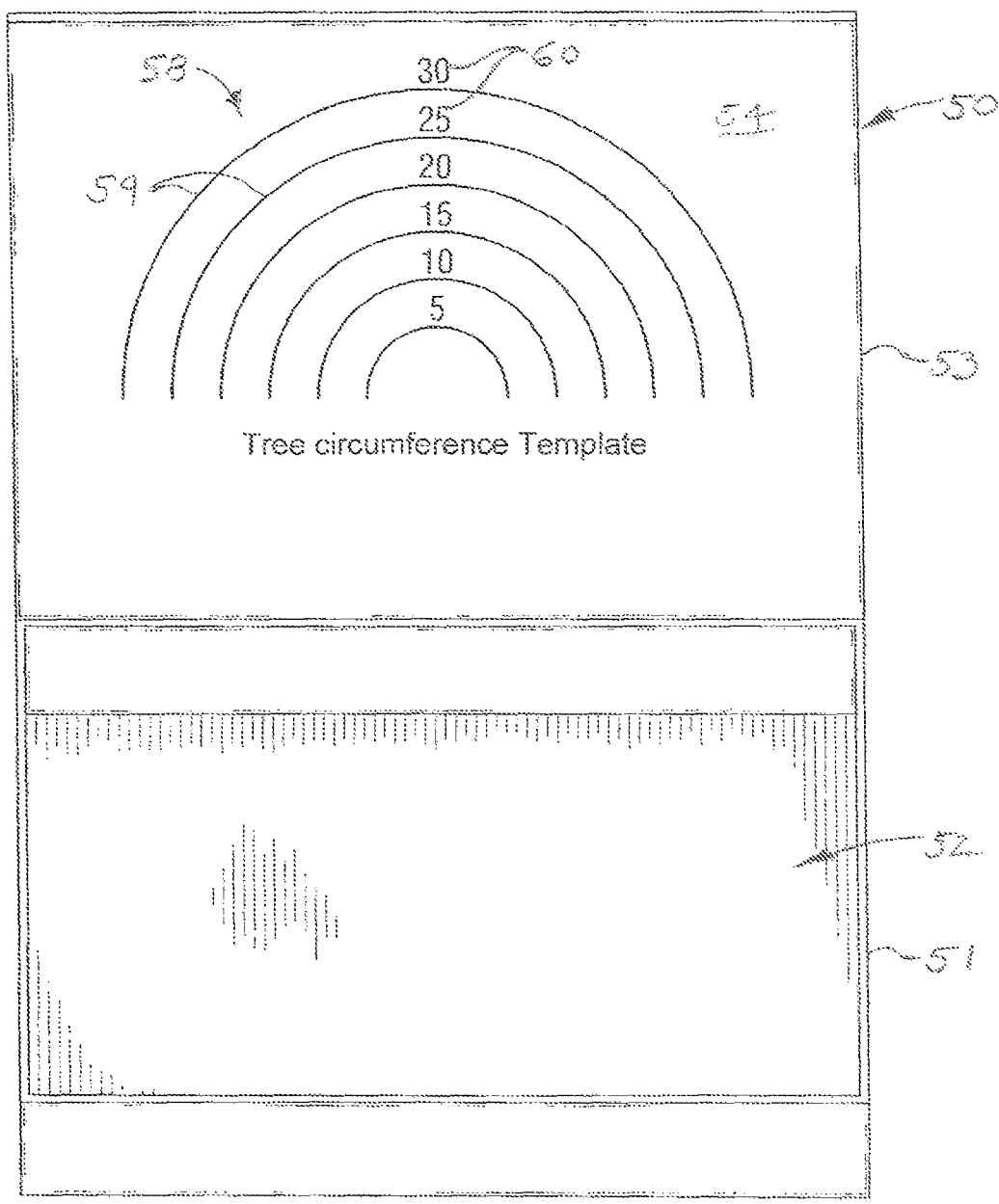
FIG. 6 is a top view of a typical packaging container suitable for packaging the animal deterrent apparatuses, with a structure circumference template included on an interior surface of the container for use as a guide in sizing the apparatus frame for a particular protected structure in application of the animal deterrent apparatus.

As illustrated in FIG. 6, in some applications, a packaging container 50 may be sized and configured to accommodate at least the apparatus frame 2 of the animal deterrent apparatus 1 for retail purposes. The packaging container 50 may have any design which facilitates accommodation of the apparatus frame 2 therein. Accordingly, an example of a packaging container 50 which is suitable for the purpose may include a base portion 51 having a container interior 52. A lid portion 53 may detachably or pivotally interface with the base portion 51. It will be recognized and understood that the packaging container 50 may have any alternative design or structure which is known by those skilled in the art and suitable for containing and packaging at least the apparatus frame 2 of the animal deterrent apparatus 1.

A structure circumference template 58 may be provided on an interior or exterior surface of the packaging container 50, such as on the interior surface 54 of the lid portion 53, for example and without limitation. In some embodiments, the structure circumference template 58 may be printed or otherwise provided on an insert (not illustrated) which is may be placed in the packaging container 50 and selectively removed from the packaging container 50 for use. The structure circumference template 58 may include multiple diameter marking lines 59 which correspond to the widths or diameters of different-sized protected structures 36. The diameter marking lines 59 may be labeled with circumference markings 60 which indicate the circumferences which correspond to and are represented by the diameter marking lines 59 in centimeters, inches or other units.

The structure circumference template 58 may facilitate cutting of the apparatus frame 2 to achieve an interior width/diameter 12 (FIG. 1) having a selected size to fit the protected structure 36. Accordingly, the circumference of the protected structure 36 on which the apparatus 1 is to deployed may be initially measured. Each of the first apparatus frame section 4 and the second apparatus frame section 5 may be individually placed on the tree circumference template 58. The diameter marking line 59 which corresponds to the measured circumference of the protected structure 36 as indicated by the circumference markings 60 is noted. The connecting frame members 10 on the main frame portion 3 of the apparatus frame 2 may be cut or first marked at the noted diameter marking line 59 and then cut to achieve an interior width/diameter 12 having the appropriate size for each of the first apparatus frame section 4 and the second apparatus frame section 5 to fit around opposite sides of the protected structure 36.

While illustrative embodiments of the disclosure have been described above, it will be recognized and understood that various modifications can be made in the disclosure and the appended claims are intended to cover all such modifications which may fall within the spirit and scope of the disclosure.

What is claimed is:

1. An animal deterrent apparatus, comprising:
an apparatus frame including:
an at least partially electrically-conductive main frame portion;
an at least partially electrically-conductive electrified frame portion generally exterior to the main frame portion; and
at least one electrically-insulating element between the electrified frame portion and the main frame portion;
a ground electrically connected to the main frame portion of the apparatus frame;
an electrifying source electrically connected to the electrified frame portion of the apparatus frame;
wherein the apparatus frame comprises a first apparatus frame section and a second apparatus frame section carried by the first apparatus frame section; and
wherein the second apparatus frame section is detachably carried by the first apparatus frame section, and further comprising at least one frame section bracket attaching the second apparatus frame section to the first apparatus frame section.

2. The animal deterrent apparatus of claim 1 wherein the apparatus frame is generally circular.

3. The animal deterrent apparatus of claim 2 wherein the apparatus frame comprises a plurality of concentric frame members and a plurality of connecting frame members connecting the plurality of concentric frame members.

4. The animal deterrent apparatus of claim 3 wherein the plurality of concentric frame members comprises an outer concentric frame member, an inner concentric frame member and at least one middle concentric frame member between the outer concentric frame member and the inner concentric frame member.

5. The animal deterrent apparatus of claim 1 wherein the electrified frame portion comprises a plurality of frame hooks carried by the at least one electrically-insulating element and an electrically-conductive electrified element carried by the plurality of frame hooks.

6. The animal deterrent apparatus of claim 1 further comprising a packaging container sized and configured to accommodate at least the apparatus frame and a structure diameter template provided on the packaging container, the structure diameter template adapted to facilitate cutting of the apparatus frame to a selected size.

7. An animal deterrent apparatus, comprising:
at least one frame mount bracket;
an apparatus frame including:
an at least partially electrically-conductive main frame portion carried by the at least one frame mount bracket;
an at least partially electrically-conductive electrified frame portion generally exterior to the main frame portion; and
at least one electrically-insulating element between the electrified frame portion and the main frame portion;
a ground electrically connected to the main frame portion of the apparatus frame; and
an electrifying source electrically connected to the electrified frame portion of the apparatus frame.

8. An animal deterrent apparatus, comprising:
an apparatus frame including:
an at least partially electrically-conductive main frame portion having:
a plurality of concentric frame members; and
a plurality of connecting frame members connecting the plurality of concentric frame members;
a plurality of electrically-insulating elements carried by the plurality of connecting frame members, respectively, of the main frame portion; and
an at least partially electrically-conductive electrified frame portion including:
a plurality of frame hooks carried by the plurality of electrically-insulating elements, respectively; and
an electrically-conductive electrified element carried by the plurality of frame hooks;
a ground electrically connected to the main frame portion of the apparatus frame; and
an electrifying source electrically connected to the electrified element of the electrified frame portion of the apparatus frame.

9. The animal deterrent apparatus of claim 8 wherein the apparatus frame comprises a first apparatus frame section and a second apparatus frame section carried by the first apparatus frame section.

10. The animal deterrent apparatus of claim 9 wherein the second apparatus frame section is detachably carried by the first apparatus frame section, and further comprising at least one frame section bracket attaching the second apparatus frame section to the first apparatus frame section.

11. The animal deterrent apparatus of claim 8 wherein the apparatus frame is generally circular.

12. The animal deterrent apparatus of claim 8 wherein the plurality of concentric frame members comprises an outer concentric frame member, an inner concentric frame member and at least one middle concentric frame member between the outer concentric frame member and the inner concentric frame member.

13. The animal deterrent apparatus of claim 8 further comprising at least one frame mount bracket, and wherein the apparatus frame is carried by the at least one frame mount bracket.

14. The animal deterrent apparatus of claim 8 further comprising a packaging container sized and configured to accommodate at least the apparatus frame and a structure diameter template provided on the packaging container, the structure diameter template adapted to facilitate cutting of the apparatus frame to a selected size.

15. An animal deterrent apparatus, comprising:
an apparatus frame with a first apparatus frame section and a second apparatus frame section complementary to and carried by the first apparatus frame section, the apparatus frame including:
an at least partially electrically-conductive main frame portion having:
a plurality of concentric frame members; and
a plurality of connecting frame members connecting the plurality of concentric frame members;
a plurality of electrically-insulating elements carried by the plurality of connecting frame members, respectively, of the main frame portion, the plurality of electrically-insulating elements beveled and disposed at an obtuse angle to the plurality of connecting frame members, respectively, of the main frame portion; and
an at least partially electrically-conductive electrified frame portion including:
a plurality of frame hooks carried by the plurality of electrically-insulating elements, respectively; and
an electrically-conductive electrified element carried by the plurality of frame hooks;
a ground electrically connected to the main frame portion of the apparatus frame; and an electrifying source electrically connected to the electrified element of the electrified frame portion of the apparatus frame.

16. The animal deterrent apparatus of claim 15 further comprising at least one frame section bracket attaching the second apparatus frame section to the first apparatus frame section.

17. The animal deterrent apparatus of claim 15 wherein the plurality of concentric frame members comprises an outer concentric frame member, an inner concentric frame member and at least one middle concentric frame member between the outer concentric frame member and the inner concentric frame member.

18. The animal deterrent apparatus of claim 15 further comprising a packaging container sized and configured to accommodate at least the apparatus frame and a structure diameter template provided on the packaging container, the structure diameter template adapted to facilitate cutting of the apparatus frame to a selected size.

* * * * *